United States Patent
Hirsch et al.

(10) Patent No.: US 6,599,374 B1
(45) Date of Patent: Jul. 29, 2003

(54) METHOD FOR PRODUCING A MIXTURE OF IRON CARBIDE AND GRANULAR, DIRECTLY REDUCED IRON

(75) Inventors: Martin Hirsch, Friedrichsdorf (DE); Alpaydin Saatci, Frankfurt am Main (DE)

(73) Assignee: Metallgesellschaft AG, Frankfurt am Main (DE)

( * ) Notice: Subject to any disclaimer, the term of this patent is extended or adjusted under 35 U.S.C. 154(b) by 0 days.

(21) Appl. No.: 09/529,241

(22) PCT Filed: Oct. 29, 1998

(86) PCT No.: PCT/EP98/06869

§ 371 (c)(1), (2), (4) Date: Jun. 26, 2000

(87) PCT Pub. No.: WO99/24625

PCT Pub. Date: May 20, 1999

(30) Foreign Application Priority Data

Nov. 6, 1997 (DE) .......................... 197 48 968

(51) Int. Cl.$^7$ ................................ C23C 8/20
(52) U.S. Cl. .................... 148/209; 75/444; 75/447; 75/448; 423/148; 423/439
(58) Field of Search ............. 148/209; 75/444, 75/447, 448; 423/148, 439

(56) References Cited

U.S. PATENT DOCUMENTS 3,619,262 A 11/1971 Segura ................ 117/100 M
3,833,343 A 9/1974 Holowaty et al. ........ 29/180 R
5,445,667 A 8/1995 Malmström .................. 75/448

FOREIGN PATENT DOCUMENTS

| | | | |
|---|---|---|---|
| DE | 195 38 591 C | 4/1997 | |
| DE | 195 38 591 | 4/1997 | ........... C21B/13/02 |
| FR | 2 134 467 A | 12/1972 | |
| FR | 2 134 467 | 12/1972 | ........... C22B/7/00 |
| FR | 2 360 670 A | 3/1978 | |
| GB | 1 310 050 A | 3/1973 | |
| GB | 1 310 050 | 3/1973 | ........... C21B/13/00 |
| GB | 1541995 | 7/1977 | |
| GB | 1 541 995 | 3/1979 | ........... C21B/13/00 |
| JP | 54-1300 A * | 1/1979 | |
| WO | WO 93/15232 | 8/1993 | ........... C21B/13/00 |
| WO | 93/15232 A | 8/1993 | |

* cited by examiner

*Primary Examiner*—Roy King
*Assistant Examiner*—Andrew Wessman
(74) *Attorney, Agent, or Firm*—Morris McLaughlin & Marcus

(57) ABSTRACT

An end product containing iron carbide ($Fe_3C$) is produced from an intermediate product consisting of granular, directly reduced iron. Said intermediate product is supplied by an iron ore reduction plant and is fed to a carburization reactor. Liquid hydrocarbons are conveyed to the carburization reactor at temperatures of 500 to 900° C., at least part of the granular, directly reduced iron being subjected to a swirling movement. The end product removed from the carburization reactor consists of 5 to 90 wt. % $Fe_3C$. A fluidization gas containing methane and hydrogen can be added to the carburization reactor in addition to the hydrocarbons.

6 Claims, 1 Drawing Sheet

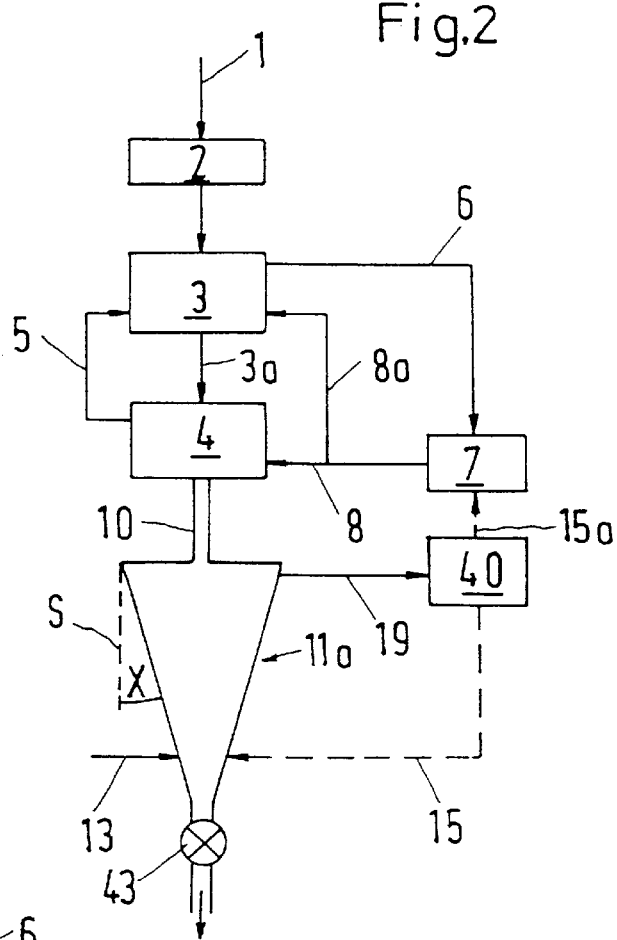
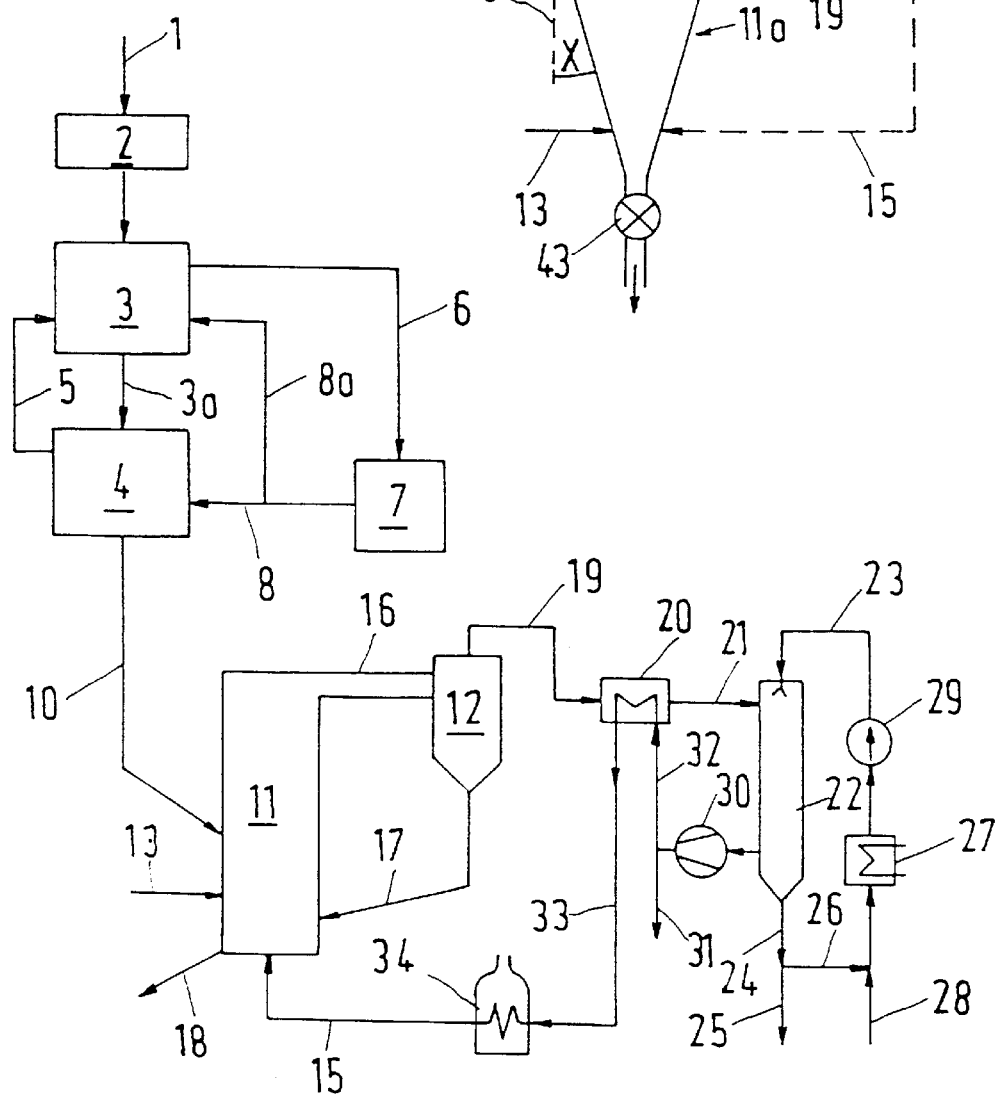

METHOD FOR PRODUCING A MIXTURE OF IRON CARBIDE AND GRANULAR, DIRECTLY REDUCED IRON

DESCRIPTION

This invention relates to a process of producing an end product containing iron carbide ($Fe_3C$) from an intermediate product consisting of granular, directly reduced iron (DRI), which comes from an iron ore reduction plant, where the DRI is supplied to a carburizing reactor. Among experts, directly reduced iron is also referred to as DRI or as sponge iron.

From the U.S. Pat. Nos. 5,527,379 and 5,603,748 the direct reduction of iron oxide is known, where in several fluidized beds granular material containing iron oxide is brought in direct contact with hot reduction gas at temperatures of 500 to 900° C. When the reduction gas has a considerable content of carbon monoxide in addition to hydrogen, a product rich in $Fe_3C$ can be withdrawn from the last stage of the fluidized bed of the known reduction process. Practice has shown, however, that in the reduction of iron oxide to iron the resulting steam greatly impedes the simultaneous formation of iron carbide by reacting iron with CO and/or $CH_4$.

DE-C-195 38 591 describes the carburization of DRI in a moving container, where the DRI is supplied at temperatures of 800 to 1100° C., and for instance liquid hydrocarbons are introduced. The aim is not to achieve a high content of $Fe_3C$ in the product, but rather relatively high temperatures are employed, at which the liquid hydrocarbons in contact with the hot DRI chiefly lead to the formation of soot. The soot formed does not or hardly react to form $Fe_3C$ and is withdrawn together with the carburized product.

It is the object underlying the invention to effect the carburization of the hot, directly reduced iron outside the reduction plant in a carburizing reactor such that the formation of soot is wholly or largely suppressed. Furthermore, it should be possible to produce a product with a variable content of $Fe_3C$. In accordance with the invention this is achieved in the above-mentioned process in that liquid hydrocarbons are supplied to the carburizing reactor at temperatures in the range from 500 to 900° C., where at least part of the granular DRI is fluidized, and that from the carburizing reactor the end product is withdrawn, which consists of 5 to 90 wt-% $Fe_3C$. Preferably, the end product consists of at least 10 wt-% $Fe_3C$. The carburizing reactor can be operated continuously or discontinuously.

The liquid hydrocarbons introduced into the carburizing reactor may be of different kinds. Expediently, various types of fuel oil may be used, starting with extra light fuel oil up to heavy fuel oil. Usually, 0.005 to 0.2 kg liquid hydrocarbons per kg DRI supplied to the carburizing reactor are introduced into the lower portion of the reactor. The liquid hydrocarbons introduced into the carburizing reactor lead to an intensive formation of gas in the hot solid bed, which at least partly fluidizes the bed. When it is desired to perform the carburization in the fluidized bed, it is recommended to also introduce a fluidizing gas into the lower portion of the bed in addition to the liquid hydrocarbons. Care will be taken that the water content of the fluidizing gas is not more than 1.5 vol-%. Preferably, a methane-containing fluidizing gas will be employed, which may also have a hydrogen content. A suitable fluidizing gas is for instance the exhaust gas of the carburizing reactor, which has first been dehydrated.

In the carburizing reactor, a gas mixture containing methane and hydrogen in addition to $Fe_3C$ is formed from the liquid hydrocarbons, which gas mixture is withdrawn as exhaust gas. Upon cooling the exhaust gas, a water-containing condensate is formed, which will be separated. At least part of the cooled exhaust gas can be reheated and be introduced into the reactor as fluidizing gas. This fluidizing gas consists of about 40 to 95 vol-% hydrogen, and the methane content lies in the range from 5 to 50 vol-%. These percentages have been calculated anhydrous and without taking into account a usually present nitrogen content. The fluidizing gas may furthermore contain carbon oxides.

The fluidizing gas introduced into the fluidized bed of the reactor, usually recirculated exhaust gas, is not or not significantly involved in the formation of carbide in the reactor. Preferably, iron carbide is chiefly produced in the reactor by the free carbon, which is briefly formed upon cracking the liquid hydrocarbon. This carbon is very reactive and at the existing temperatures intensively reacts with metallic iron to form iron carbide. From the fluidized bed, a carburized product can therefore be withdrawn, which consists of at least 30 wt-% $Fe_3C$.

When the carbon content of the end product is stated, there is always meant the entire C content, which may be present both in the bound form ($Fe_3C$) and as free carbon in the form of soot. The C content in the end product mostly is not more than 3 wt-%. It is, however, easily possible to produce an end product with a higher C content. With a C content of 3 wt-%, the end product contains about 50 wt-% $Fe_3C$ and possibly in addition a small amount of free carbon.

One process variant consists in that the fluidizing gas is omitted and only the liquid hydrocarbons are supplied to the carburizing reactor. The temperatures at which the desired formation of carbide takes place in this case lie in the range from 580 to 700° C. and preferably 600 to 680° C. When the temperatures are too high, the formation of $Fe_3C$ greatly decreases. When the temperatures in the fluidized bed are maintained at about 640 to 700° C., an end product with a relatively low $Fe_3C$ content is produced, where the carbon content lies in the vicinity of 1 wt-%. It was found out that such product is well suited for the subsequent hot briquetting in the roller press under an inert atmosphere. If it is desired to achieve a higher $Fe_3C$ content in the end product, which corresponds to a carbon content of more than 2 wt-%, relatively low temperatures in the range from 580 to 640° C. will be provided in the fluidized bed.

It may be advantageous to provide the solid bed in a conical carburizing reactor which is downwardly tapered. With this shape of the reactor the solid bed will be fluidized intensively by the formation of gas, so that a fluidized bed can be formed. This fluidized bed promotes the mass transfer and thus the formation of carbide. Usually, the fluidized bed in the conical carburizing reactor has a height of 1 to 4 m. It may in addition be expedient to maintain an elevated pressure up to about 10 bar in the reactor, so as to increase the reaction rate.

Advantageously, the granular, directly reduced iron (DRI) comes from a reduction plant, in which it is treated in the last reduction stage in a fluidized bed. To this fluidized bed, a gas with a $H_2$ content of at least 90 vol-% and a temperature of 600 to 1000° C. is supplied as fluidizing and reduction gas. Details of such reduction plant are described in the U.S. Pat. Nos. 5,527,379 and 5,603,748. The iron ore is first heated to temperatures of 500 to 900° C. and is then supplied to the first reduction stage. This first reduction stage is designed as circulating fluidized bed, to which a fluidizing gas with a $H_2$ content of at least 75 vol-% is supplied. The temperatures in the first reduction stage lie in the range from 600 to 800° C. Partly reduced ore with a degree of metallization of usually 50 to 80% is then supplied to the second (and also last) reduction stage. In this last reduction stage a stationary fluidized bed is employed, which expediently comprises several departments disposed one beside the other, which are separated from each other by overflow weirs. This is also described in the above-mentioned U.S. patents. The DRI thus produced has a degree of metallization of more than 85% and usually at least 90%.

Embodiments of the process will be explained with reference to the drawing, wherein:

FIG. 1 represents a flow diagram of a first process variant, and

FIG. 2 represents a second process variant.

From granular iron oxide, which is supplied via line 1, see FIG. 1, DRI is first of all produced by means of reduction. The reduction may be effected in any manner known per se. An advantageous procedure is described in the above-mentioned U.S. Pat. Nos. 5,527,379 and 5,603,748. Subsequent to a drying and heating stage 2 a first reduction stage 3 is provided and an adjoining second reduction stage 4. In both reduction stages, the reduction is performed in the fluidized bed, where hot gas containing hydrogen is used as reduction and fluidizing gas.

The temperatures in the two stages 3 and 4 lie in the range from 500 to 900° C. The first stage 3 is designed as circulating fluidized bed, where at least in part used, $H_2$-containing reduction gas from the second stage 4 is supplied through line 5. Via line 6, the exhaust gas of the first stage is recirculated to a processing plant 7, in which there is also produced fresh gas rich in hydrogen. Through line 8, the gas is supplied as hot reduction gas to the second reduction stage 4, in which the solids form a stationary fluidized bed. Usually, the gas of line 8 consists of at least 90 vol-% hydrogen. A partial stream of the reduction gas from line 8 is expediently supplied through line 8a directly into the first stage 3. The degree of metallization in the partly reduced ore of line 3a is about 50 to 80%.

From the second reduction stage 4 granular DRI is withdrawn, which is practically free from carbon. This directly reduced iron, which has temperatures in the range from 650 to 900° C., is supplied through the passage 10 to the carburization, where it is charged into a fluidized-bed reactor 11, which is connected with a cyclone separator 12. For carburizing purposes, liquid hydrocarbons, e.g. fuel oil, are supplied through line 13. In the reactor, the temperatures lie in the range from 500 to 900° C. Hot fluidizing gas, which contains hydrogen and methane, is supplied via line 15. A gas-solids suspension flows from the upper portion of the reactor 11 through the passage 16 into the separator 12, and separated solids are recirculated to the reactor 11 through line 17. The carburized end product withdrawn from the lower portion of the reactor 11 through the passage 18 consists of metallic iron and $Fe_3C$, where the $Fe_3C$ content is usually at least 30 wt-%, and the C content of the end product is at least 2 wt-%.

As a result of cracking processes, a gas mixture is formed in the reactor 11, which leaves the separator 12 through line 19 as exhaust gas. To be cooled, this exhaust gas first flows through the heat exchanger 20 and is then introduced into a washing cooler 22 via line 21. Into this washing cooler, condensate rich in water is injected, which comes from line 23. Dust-laden condensate is withdrawn via line 24, part of the solids-containing liquid is removed from the process through line 25, and via line 26 the remaining condensate is supplied to a cooler 27. Fresh water is supplied via line 28. In the cooler, the liquid rich in water is cooled to temperatures of about 30 to 70° C. and is then recirculated to the washing cooler 22 by means of the circulating pump 29.

Cooled and dedusted exhaust gas is sucked in by the blower 30, a partial stream is removed from the process through line 31, and the remaining exhaust gas flows through line 32 into the heat exchanger 20 for being heated and then flows through line 33 to a fired heater 34, before the exhaust gas is recirculated with temperatures of 300 to 700° C. through line 15 to the carburizing reactor 11.

In accordance with FIG. 2, the hot DRI is supplied through the passage 10 to the carburizing reactor 11a. The reactor 11a has a conical shape, where the cone angle X, measured against the vertical S, usually lies in the range from 10 to 30°. Liquid hydrocarbons are supplied through line 13, where they evaporate in the hot solid bed provided in the reactor 11a. At least part of the hydrocarbon molecules react with metallic iron to form $Fe_3C$. These and other reactions lead to an intensive formation of gas. The gases, which contain hydrogen and methane, fluidize the solids and lead to the formation of a fluidized bed. The conical shape of the reactor 11a promotes the formation of the desired fluidized bed.

Through a metering member 43, e.g. a ball valve, the carburized end product is withdrawn, whose $Fe_3C$ content usually is 5 to 50 wt-% and preferably at least 10 wt-%. The exhaust gas withdrawn via line 19 contains considerable amounts of hydrogen and methane. It may therefore be recommended to wholly or partly introduce this exhaust gas into the plant 7, as is indicated by the broken line 15a. Upon treatment in a processing plant 40, as described in FIG. 1, the exhaust gas may, however, also be recirculated as fluidizing gas through line 15 into the reactor 11a. The remaining reference numerals have the meaning already explained in conjunction with FIG. 1.

EXAMPLE 1

In a procedure corresponding to FIG. 1 of the drawing, 600,000 t $Fe_3C$/year should be produced from an iron ore with an Fe content of 67 wt-%, which consists of 96 wt-% $Fe_2O_3$. In addition to other gangue the ore contains 2.4 wt-% $SiO_2$. The following data have been calculated in part, and they are based on a reduction plant as it is described in the U.S. Pat. No. 5,603,748.

Having been heated to 850° C., the ore with a grain size in the range from 0.1 to 1 mm reaches the first reduction stage 3, which is designed as circulating fluidized bed and has a temperature of about 630° C. The hot reducing fluidizing gas supplied to stage 3 consists of 85 vol-% hydrogen; 3 $Nm^3$ $H_2$/kg iron ore are supplied to the first stage 3. Partly reduced ore with a degree of metallization of 75% is supplied through line 3a to the second reduction stage 4, which is operated in the stationary fluidized bed at temperatures of 680° C. 2 $Nm^3$ hot hydrogen/kg solids are supplied to stage 4 as fluidizing gas, the gas of line 8 consists of 90 vol-% $H_2$ and also contains 9 vol-% $N_2$ and 1 vol-% $H_2O$.

For the formation of carbide, 63.6 t/h DRI with a temperature of 680° C. and a negligeably small C content are introduced into the reactor 11, where the temperature is maintained at 600° C. and the pressure is 1.3 bar. The DRI consists of 88 wt-% metallic Fe, 8.5 wt-% FeO and 3.5 wt-% $SiO_2$.

For carburization, 2.9 t/h light fuel oil are supplied to the reactor 11, and 25000 $Nm^3$/h recirculated exhaust gas with a $H_2$ content of 88.5 vol-%, a $CH_4$ content of 8.5 vol-%, an $N_2$ content of 1.5 vol-% and a $H_2O$ content of 1.5 vol-% are supplied through line 15. In the various lines the following gas quantities are flowing:

| Line | 19 | 32 | 31 | 15 |
|---|---|---|---|---|
| Gas quantity (Nm³/h) | 29,400 | 25,000 | 4,400 | 25,000 |
| Temperature (° C.) | 600 | 30 | 30 | 850 |

The carburized DRI withdrawn via line 18 has an $Fe_3C$ content of 40 wt-% and furthermore consists of 8 wt-% FeO, 3 wt-% $SiO_2$ and 48 wt-% metallic iron. The carbon content of the carburized DRI is 2.9 wt-%, of which 90% are bound as $Fe_3C$.

EXAMPLE 2

From the DRI used in Example 1 there is now produced a polycarburized end product with an $Fe_3C$ content of 89 wt-%. For this purpose, 5.9 t/h light fuel oil are supplied to the reactor 11 for carburization, and 52900 Nm³/h recirculated exhaust gas with a $H_2$ content of 63 vol-%, a $CH_4$ content of 34 vol-%, an $N_2$ content of 2.5 vol-% and a $H_2O$ content of 0.5 vol-% are supplied through line 15. In the various lines the following gas quantities are flowing:

| Line | 19 | 32 | 31 | 15 |
|---|---|---|---|---|
| Gas quantity (Nm³/h) | 60,700 | 52,900 | 7,800 | 52,900 |
| Temperature (° C.) | 600 | 35 | 35 | 800 |

The carburized sponge iron withdrawn via line 18 has an $Fe_3C$ content of 89 wt-% and consists of 8 wt-% FeO and 3 wt-% $SiO_2$.

EXAMPLE 3

The procedure is as illustrated in FIG. 2, and there is used a DRI produced as in Example 1, which now has a temperature of 750° C. 63.6 t/h DRI are introduced into the carburizing reactor 11a, which has a height of 4.5 m, has a conical shape and operates without supply of fluidizing gas. In the reactor 11a there is provided a fluidized bed with a height of 3 m, as measured from the entrance of line 13. The pressure in the reactor is 2 bar, the temperature in the fluidized bed is maintained at 680° C. Through line 13, an amount of 0.7 t/h light fuel oil is supplied, which has been preheated to 400° C. From the reactor 11a a carburized end product is withdrawn, whose $Fe_3C$ content is 12 wt-%, and which apart from metallic iron contains 9 wt-% FeO and 3 wt-% $SiO_2$. The C content of this product is 0.8 wt-%. The exhaust gas of line 19 contains 870 Nm³/h $H_2$ and 130 Nm³/h $CH_4$.

EXAMPLE 4

The procedure is similar to Example 3, but now 228 t/h DRI with a temperature of 750° C., a total Fe content of 95 wt-%, an FeO content of 8.5 wt-% and an $SiO_2$ content of 3 wt-% are supplied to the carburizing reactor 11a. The DRI is virtually free from carbon. For carburizing purposes an amount of 5.7 t/h extra light fuel oil is used, which has been preheated to 400° C. There is withdrawn an amount of 232.1 t/h carburized end product with a temperature of 600° C. and a C content of 1.8 wt-%, based on the total Fe content of the product. The end product contains 26.5 wt-% $Fe_3C$, 8.4 wt-% FeO and 2.9 wt-% $SiO_2$. The exhaust gas of line 19 contains 7000 Nm³/h $H_2$ and 1300 Nm³/h $CH_4$.

What is claimed is:

1. A process for producing iron carbide from granular, directly reduced iron obtained from the reduction of iron ore, which comprises supplying granular, directly reduced iron ore to a carburizing reactor and forming a fluidized bed of at least a part thereof in said carburizing reactor, supplying a liquid hydrocarbon to said reactor at a temperature of from 500° C. to 900° C. vaporizing said liquid hydrocarbon in said carburizing reactor and reacting the vaporized hydrocarbon with the fluidized directly reduced iron at a temperature of 580° C. to 700° C. to form a product comprising from 5 to 90% wt. iron carbide, and withdrawing at least a part of said product from said carburizing reactor.

2. The process of claim 1, wherein said product comprises not more than 3 wt % carbon.

3. The process of claim 1 wherein the amount of liquid hydrocarbon supplied is from 0.005 to 0.2 kg per kg of directly reduced iron supplied.

4. The process of claim 1 further comprising withdrawing an exhaust gas from said carburizing reactor, said gas comprising methane, hydrogen and water, cooling said gas, separating water therefrom, and then heating at least a part of said gas and recirculating it to said reactor.

5. The process of claim 1, wherein said reactor is conical and is downwardly tapered.

6. The process of claim 1, wherein said carburizing reactor is maintained at a pressure of 1 to 10 bar.

* * * * *